United States Patent [19]
Sundsted

[11] Patent Number: 5,999,967
[45] Date of Patent: Dec. 7, 1999

[54] ELECTRONIC MAIL FILTERING BY ELECTRONIC STAMP

[76] Inventor: Todd Sundsted, 427 Shadeswood Dr., Hoover, Ala. 35226

[21] Appl. No.: 08/910,326

[22] Filed: Aug. 17, 1997

[51] Int. Cl.[6] ...................................................... G06F 17/00
[52] U.S. Cl. ................................. 709/206; 705/14; 705/39
[58] Field of Search ......................... 395/200.36, 200.47; 380/25, 49; 705/14, 7, 10, 26, 39; 707/501, 513, 10; 358/402; 709/205, 206, 207

[56] References Cited

U.S. PATENT DOCUMENTS

| | | | |
|---|---|---|---|
| 4,962,532 | 10/1990 | Kasiraj et al. | 380/25 |
| 5,377,354 | 12/1994 | Scannell et al. | 395/650 |
| 5,508,817 | 4/1996 | Kunigami | 358/402 |
| 5,555,346 | 9/1996 | Gross et al. | 395/51 |
| 5,613,108 | 3/1997 | Morikawa | 393/616 |
| 5,619,648 | 4/1997 | Cannale et al. | 395/200.36 |
| 5,774,552 | 6/1998 | Grimmer | 380/25 |
| 5,781,901 | 7/1998 | Kuzma | 707/10 |
| 5,794,210 | 8/1998 | Goldhaber et al. | 705/14 |
| 5,903,880 | 5/1999 | Biffar | 705/39 |

OTHER PUBLICATIONS

"Intellipost hopes to lure e-mail users with BonusMail incentives", Electronic Advertising & Marketplace report, v11 p. 3(1) Mar. 18, 1997.

MF Wyle "A Rule-based Electronic Mail Filter" 1989, May Proceedings of EARN 89.

Arensburger & Rosenfeld "ToTake Arms Against a Sea of Email"1995, Mar. Communications of the ACM, vol. 38 No. 3 pp. 108–109.

Stephen R van der Berg "Procmail".

VeriSign press release dated Apr. 1, 1997 "http://www.verign.com/press/product/isv.h".

*Primary Examiner*—Dung C. Dinh
*Attorney, Agent, or Firm*—Paul M. Sykes

[57] ABSTRACT

An improved method and apparatus for filtering electronic mail. The method and apparatus allows the receiver of electronic mail to make a decision to accept, reject, prioritize, or expedite delivery of a piece of electronic mail based on the value of an attached electronic stamp. The apparatus consists of two complimentary parts: a sender side part with responsibility for attaching the electronic stamp; and a receiver side part with responsibility for removing the electronic stamp and filtering the electronic mail based on the value of the electronic stamp. The method and apparatus are used in a system for reducing or eliminating the amount of junk electronic mail in the electronic mail system.

12 Claims, 6 Drawing Sheets

ELECTRONIC MAIL FILTERING BY ELECTRONIC STAMP

BACKGROUND

1. Field of Invention

This invention relates to electronic mail, specifically an improved method for filtering electronic mail.

2. Prior Art

Electronic mail, the electronic equivalent of paper based letters and memoranda, is a widely used means of written communication. Its primary advantages over other forms of written communication are its short delivery time and its low cost. These two factors contribute greatly to electronic mail's current popularity.

Unfortunately, this popularity comes with a price tag. Because electronic mail is easy, quick, and inexpensive, people seem inclined to create more of it. This forces the receiver to read and sort ever increasing quantities of it—a task that can take a considerable amount of time and effort.

Because of this, methods for automatically analyzing and filtering incoming electronic mail were developed.

Filtering

Most filtering methods build upon the premise that the receiver is not equally interested in all types of subject matter. Such methods perform some type of content based filtering on electronic mail. Content based filters examine the address of the sender of the electronic mail, the subject of the electronic mail, or the body of the electronic mail in order to decide what action to take.

One of the most popular stand-alone packages available, and one of the best examples of the state of the art, is a package called Procmail. Procmail, created by Stephen R. van den Berg, is an autonomous electronic mail processor. Once properly configured with a set of patterns and their associated actions, it goes to work on incoming electronic mail. Procmail examines each piece of electronic mail. It looks for a sequence of characters matching any one of the set of user-defined patterns. If such a sequence is found, Procmail performs the associated action on the piece of electronic mail.

An article by Arensburger and Rosenfeld, entitled "To Take Arms Against a Sea of Email", published in the Vol. 38, No. 3, March 95 edition of Communications of the ACM, describes a method for filtering electronic mail. Their scheme, nicknamed Jeeves, uses the MH mail system and a PERL package to filter electronic mail based on who it came from and who it was addressed to.

Examples of inventions claiming filtering functionality include:

U.S. Pat. No. 5,377,354 to Scannell et al. describes a method of prioritizing electronic mail based on stored rules. The system relies on keywords chosen by the user which, when found in the body of a piece of electronic mail, provide the basis for prioritization.

U.S. Pat. No. 5,555,346 to Gross et al. describes a system for triggering events in response to electronic mail messages. The events could include the filtering of electronic mail messages.

U.S. Pat. No. 5,613,108 to Morikawa describes a method of storing a data file written in an electronic mail in a folder based on a classification of the data file according to specific data contained in the electronic mail.

U.S. Pat. No. 5,619,648 to Canale et al. describes a technique for reducing the amount of electronic mail received by a user of an electronic mail system. Their solution involves adding, on the sender's side, non-address information to the electronic mail. The receiver's electronic mail filter has access to a model of the user and his or her preferences. The electronic mail filter uses the non-address information and the model information to determine whether or not the electronic mail should be provided to the user.

Junk Electronic Mail

A major annoyance associated with conventional mail is junk mail. Junk mail is typically unsolicited, is often distributed in large quantities, and is, by definition, of little interest to most of its recipients. Unfortunately, electronic mail systems suffer from their own version of the same.

Junk electronic mail is similar in spirit to junk mail, junk phone calls, and junk faxes. In each case the receiver receives unwanted material or solicitations from another party. Junk electronic mail, however, has two significant advantages the others do not. First, electronic mail is easy to send in large quantities. Off-the-shelf software can automate much of this process as well as assemble target mailing lists and handle responses. Second, electronic mail is inexpensive, especially when compared with the cost of bandwidth hungry network activities such as file transfers and image data transfers.

Junk mail (including junk electronic mail) depends for its success on it ability to satisfy two requirements. The first requirement is broad distribution. Broad distribution is necessary because typically only a small number, perhaps 1 or 2 percent, of the targeted recipients ever respond. The second requirement is low incremental cost. Because so few recipients respond, distribution costs will quickly consume profits—unless those distribution costs are small.

Junk electronic mail is successful because it satisfies both of these requirements extremely well. Any successful solution to the problem of junk electronic mail must address this fact.

A solution is necessary. The author already receives more junk electronic mail than non-junk electronic mail on any given day.

Filtering Junk Electronic Mail

Although originally designed to sort and categorize electronic mail, electronic mail filters (such as those cited above) are now being applied to the problem of detecting and rejecting junk electronic mail. Existing filters, however, have seen only moderate success. In large part, this is because they all suffer from several flaws:

First, content based filtering is difficult to do correctly.

As Canale et al. say in their background, "A problem with all such filters is that sorting for another person is difficult, even for a human being, and if a filter is going to be useful, it cannot do much worse than a human would".

This flaw shows itself in the following dilemma: content based filtering will sooner-or-later either allow through a piece of electronic mail it should have rejected, or worse, reject a piece of electronic mail it should have allowed through. Systems that depend entirely on content based filtering are especially vulnerable. A successful solution to the problem of junk electronic mail must either dramatically improve upon current content based filtering methods, or it must reduce the significance of the role content based filtering plays.

Second, none of the prior art cited above encourages the sender to voluntarily limit distribution.

Filtering electronic mail on the receiver's side is much more expensive and time consuming than simply limiting its distribution on the sender's side. Electronic mail is both easy to send and inexpensive. Therefore, there is no incentive for the sender to identify those receivers likely to be interested in the electronic mail, and to voluntarily limit its distribution to those individuals. On the contrary, the existence and use of content based filtering encourages just the opposite behavior—in order to meet response goals the sender must broaden his or her distribution. An effective solution to the problem of junk electronic mail must encourage the sender to do just the opposite.

Third, none of the prior art cited above provides a mechanism by which the sender can influence the receiver side filtering process by rating his or her own electronic mail.

Research has shown that an electronic mail filtering system can effectively use information provided by the sender to more efficiently rate a piece of electronic mail. The fatal difficulty has always been honesty. The information provided by the sender must honestly and reliably convey information about the importance of the piece of electronic mail to the receiver. A successful solution will result in a system in which the receiver can trust the sender's evaluation of the importance of the electronic mail.

This invention provides an improved method and apparatus for filtering electronic mail that addresses each of the flaws mentioned above.

OBJECTS AND ADVANTAGES

This invention in broad form consists of:

First, an electronic stamp, the value of which both the sender and the receiver agree upon.

Second, a sender side method and apparatus for attaching an electronic stamp to a piece of electronic mail.

Third, a receiver side method and apparatus for removing an electronic stamp from a piece of electronic mail and filtering the piece of electronic mail based on the value of the electronic stamp.

Accordingly, the objects and advantages of this invention are:

First, the invention removes one of the primary advantages of junk electronic mail—its low incremental cost—by requiring the sender to obtain an electronic stamp and send it along with the electronic mail. By increasing the cost of sending a piece of electronic mail, the invention encourages the sender to limit distribution and to better identify recipients who would be interested in the electronic mail. In some cases the sender may elect to forgo distribution entirely. Thus, use of the invention will immediately reduce the overall level of junk electronic mail in an electronic mail system.

Second, the invention provides a way for the sender to honestly and reliably convey to the receiver information about the importance of a piece of electronic mail. By attaching an electronic stamp of a certain value, the sender indicates in an almost universal language just how important he or she thinks the electronic mail is. The receiver can interpret this information in a effective way.

Third, the invention reduces the significance of the role content based filtering plays so as to make it more effective. For example, the receiver might create a list of names and addresses from which electronic mail is always accepted, even without an electronic stamp, and a list of names and addresses from which electronic mail is always rejected. Such narrow content based filtering is much easier to get right.

Further objects and advantages of the apparatus and methods disclosed herein will become apparent from a consideration of the drawings and ensuing descriptions.

| List of Reference Numerals | |
|---|---|
| 10 Mail Device | 26 Receiver Side Output |
| 10A Sender Mail Device | 30 Sender Side Input |
| 10B Receiver Mail Device | 31 Control Module |
| 11 User Agent | 32 History Log |
| 11A User Agent | 33 Encryption Module |
| 11B User Agent | 34 Assembly Module |
| 12 Mail Transport Agent | 35 Sender Side Output |
| 12A Mail Transport Agent | 40 Serial Number Field |
| 12B Mail Transport Agent | 41 Value Field |
| 13 Network | 42 Date Field |
| 20 Receiver Side Input | 43 Hash Field |
| 21 Disassembly Module | 44 Receiver Address Field |
| 22 Decryption Module | 45 Sender Address Field |
| 23 Analysis Module | 46 Identification Field |
| 24 Preferences Record | 47 Signature Field |
| 25 History Log | 48 Token Field |

SUMMARY

This invention provides an improved method and apparatus for filtering electronic mail.

DESCRIPTION OF THE PREFERRED EMBODIMENT

The following description is divided into four sections. The first section describes an electronic mail system and shows where this invention fits. The next two sections describe the two major parts of this invention. One part resides on the receiver's side of the electronic mail system. It is described first. The other part resides on the sender's side of the electronic mail system. It is described last. The final section describes the electronic stamp used by this invention.

The Electronic Mail System

An electronic mail system typically supports a plurality of users. Users involved in an exchange of electronic mail assume either the role of a sender or a receiver. Senders create and send electronic mail. Receivers receive and read electronic mail. Roles are dynamic. A user may be a sender during one exchange and a receiver during the next.

Every user has at his or her disposal a device to assist with sending and receiving electronic mail. This device most often takes the form of a software program or suite of software programs.

Figure 1:
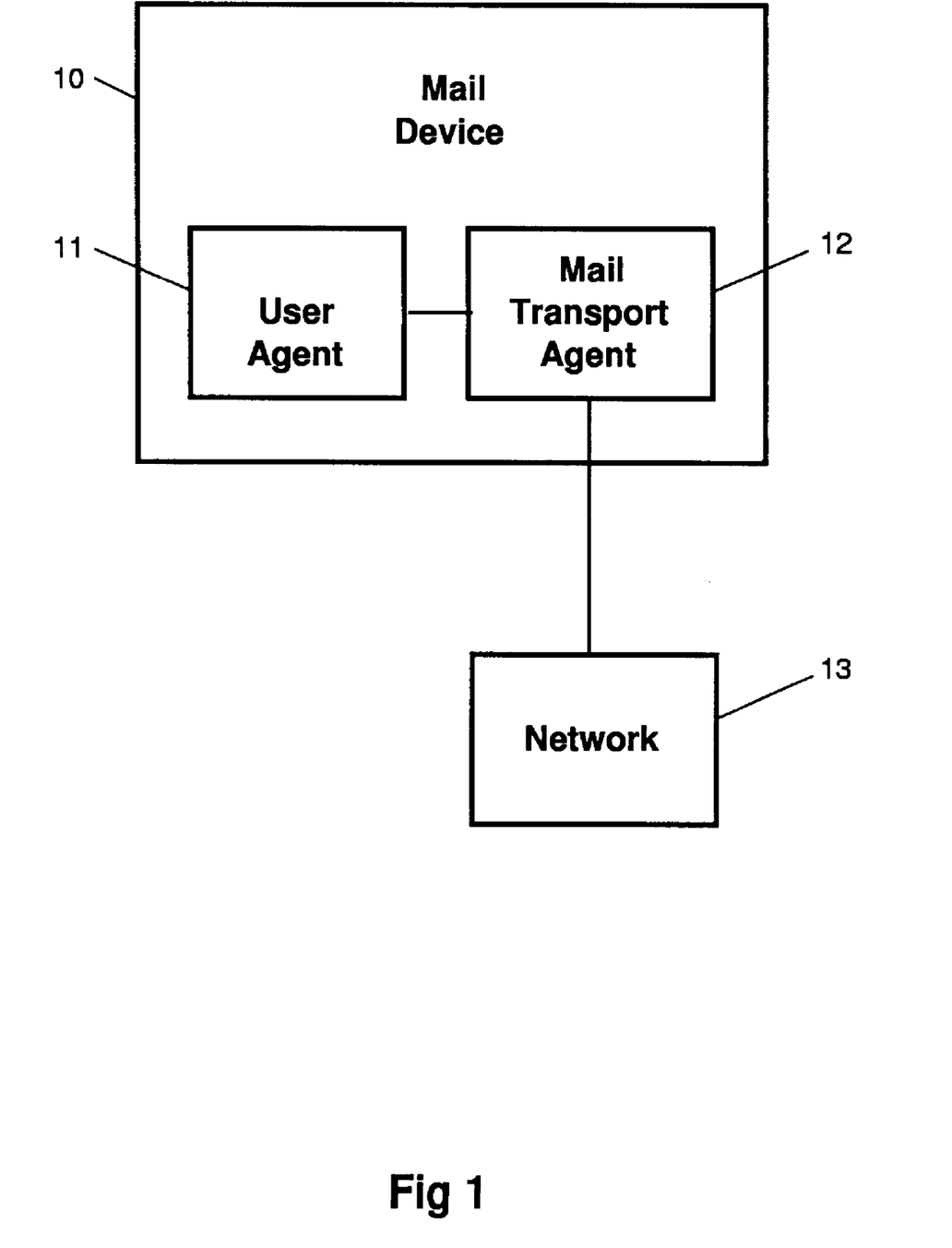
FIG. 1 is a diagram of a standard electronic mail device.

FIG. 1 shows a block diagram of such a device.

A Mail Device 10 comprises two parts. It will be understood that Mail Device 10 may include other parts, not shown in FIG. 1, whose existence current discussion.

A User Agent 11 provides a (hopefully) user friendly front-end to the electronic mail system. The user interacts exclusively with User Agent 11. User Agent 11's primarily concern is with electronic mail content issues.

A Mail Transport Agent 12 connects User Agent 11 to a Network 13. Mail Transport Agent 12 knows how to route electronic mail so that it reaches its intended receiver. Mail Transport Agent 12's primarily concern is with routing issues.

The separation between these two parts, more well-defined in the past, has blurred in recent years. It will therefore be understood that the use of such separation in this description is meant to emphasize functional differences between the parts. In practice, no such separation is implied nor is it necessary.

Network 13 isn't part of the device, as such. Rather it is the medium by which each device is connected to others and over which electronic mail flows.

The combination of a network and a plurality of these devices creates an electronic mail system.

Figure 2:
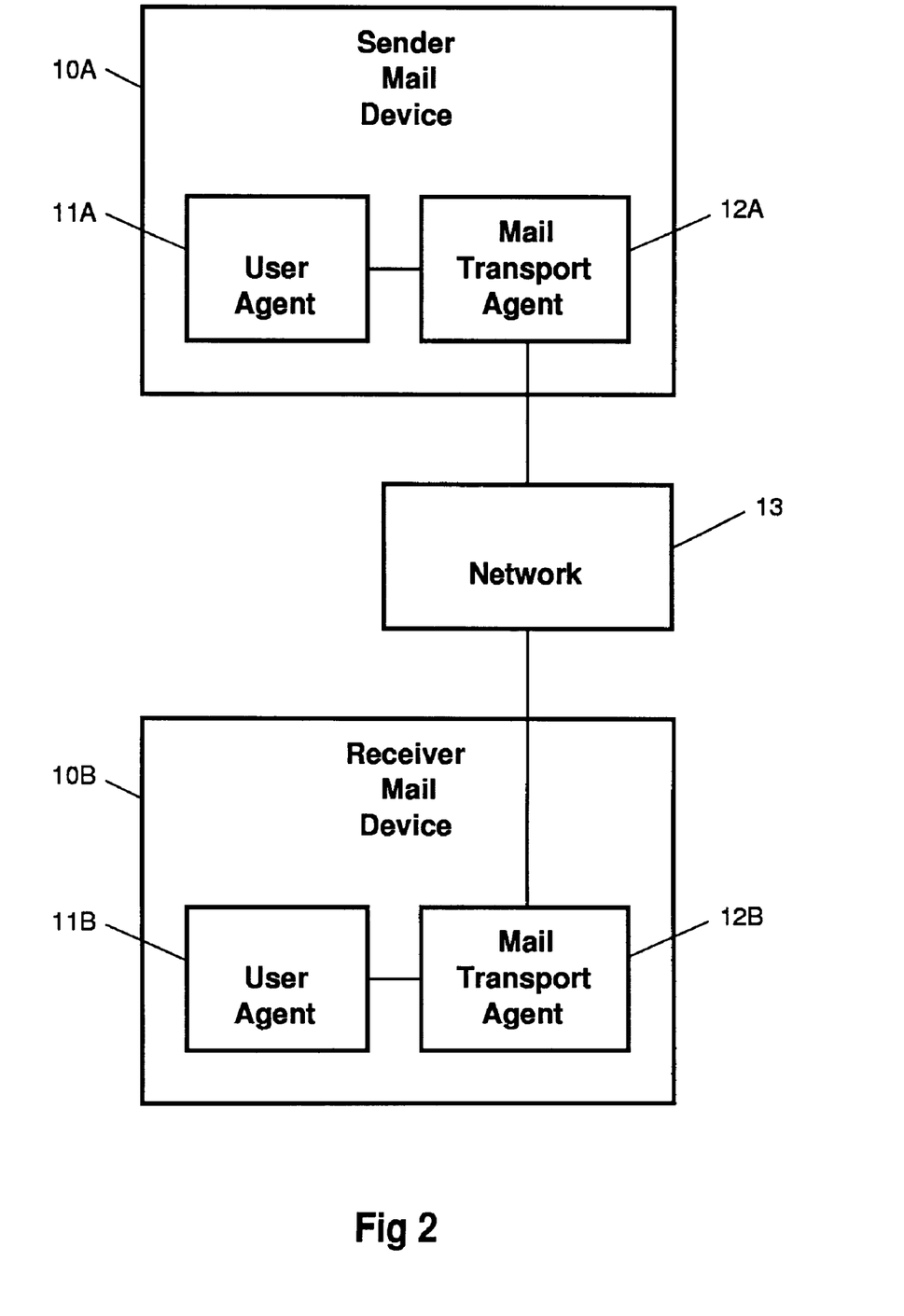
FIG. 2 is a diagram of a simple electronic mail system.

FIG. 2 shows an electronic mail system consisting of only one sender side device and only one receiver side device.

A device functions differently depending on whether it is being used by the sender or by the receiver. The following discussion illustrates the differences.

On the sender side, a user interacts with a sender side User Agent 11A in order to compose her electronic mail. User Agent 11A provides such tools as are necessary to accomplish this task, including text processing, spelling correction, and local storage.

A sender side Mail Transport Agent 12A sends electronic mail to the receiver via Network 13.

On the receiver side, a receiver side Mail Transport Agent 12B receives and stores electronic mail as it arrives from the sender. It holds the electronic mail until the user is ready to read it.

A user interacts with a receiver side User Agent 11B in order to read his electronic mail. User Agent 11B also provides tools for storing and replying to electronic mail.

This invention is meant to be used in an electronic mail system similar to the system described above.

Like the electronic mail system described above, this invention comprises two parts—one resides on the sender's side of the electronic mail system and the other resides on the receiver's side of the electronic mail system. The sender side part prepares an electronic stamp and attaches it to a piece of electronic mail. The receiver side part removes the electronic stamp and decides whether or not to accept the piece of electronic mail based on its value.

A key component of this invention is the electronic stamp. Like a postage stamp, an electronic stamp must be attached to a piece of electronic mail before the receiver side will accept it. If the electronic stamp is not present, the receiver side will automatically reject the piece of electronic mail before the receiver ever sees it.

There are three common ways in which this invention can be added to the electronic mail system described above.

First, the two parts of the filtering apparatus are embedded within User Agent 11A and User Agent 11B respectively.

Second, the two parts of the filtering apparatus are embedded within Mail Transport Agent 12A and Mail Transport Agent 12B respectively.

Third, the two parts of the filtering apparatus are embedded between User Agent 11A and Mail Transport Agent 12A, and User Agent 11B and Mail Transport Agent 12B respectively.

Both the description of the preferred embodiment and the description of an alternate embodiment assume the second of the three configurations. The other two can be substituted with no loss of functionality.

Since this invention's stated domain is electronic mail filtering, this description does not cover electronic mail composition, handling, transport, storage, display, or other related functions; nor will it describe the methods and protocols required to carry out these functions. Such information is already widely available and understood by persons educated in the art.

The Receiver Side Apparatus

Figure 3A:
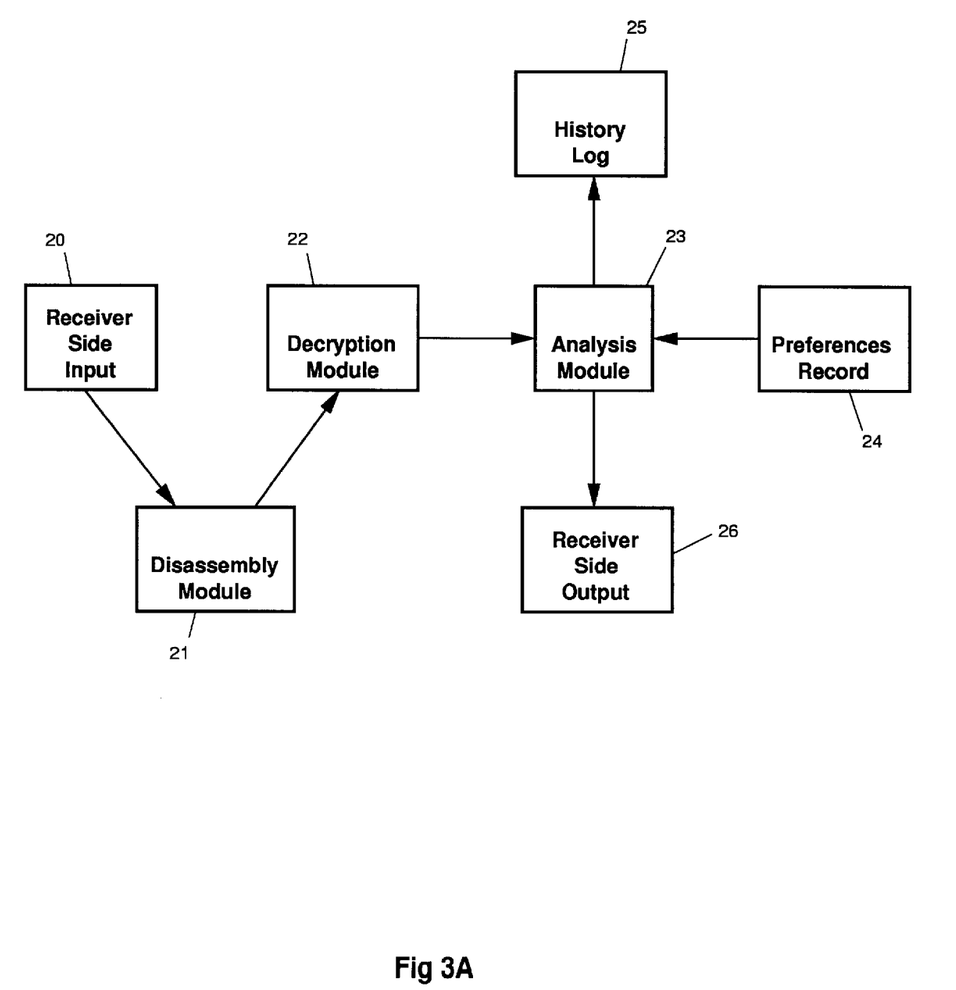
FIG. 3A is a diagram of the receiver side of the apparatus in its preferred embodiment.

FIG. 3A is a diagram of the receiver side of the filtering apparatus.

Because the primary function of the apparatus, filtering, occurs on the receiver side of the apparatus, I describe it first. The sender side of the apparatus is best viewed as playing a supporting role.

The receiver side of the apparatus removes the electronic stamp from a piece of electronic mail and decides whether or not to accept the piece of electronic mail based on its value.

It comprises:

A Receiver Side Input 20 connected to Mail Transport Agent 12A. Receiver Side Input 20 receives electronic mail from Mail Transport Agent 12A.

A Disassembly Module 21 connected to Receiver Side Input 20. Disassembly Module 21 removes the electronic stamp from electronic mail.

A Decryption Module 22 connected to Disassembly Module 21. Decryption Module 22 removes encryption, if present, from the electronic stamp. Any secure symmetric encryption algorithm may be used. Algorithms include (but are not limited to) DES, LOKI, RC2, RC4, and IDEA.

An Analysis Module 23 connected to Decryption Module 22. Analysis Module 23 validates the electronic stamp. It also decides whether to accept, reject, or otherwise handle electronic mail based on the value of its electronic stamp.

A Preferences Record 24 connected to Analysis Module 23. Preferences Record 24 holds user preferences. In particular, it holds the amount of compensation the sender desires for each piece of electronic mail received. Analysis Module 23 uses this information when deciding how to handle electronic mail.

A History Log 25 connected to Analysis Module 23. History Log 25 holds previously received electronic stamps for record-keeping as well as billing purposes.

A Receiver Side Output 26 connected to Analysis Module 23. Receiver Side Output 26 returns electronic mail to Mail Transport Agent 12A.

The Sender Side Apparatus

Figure 3B:
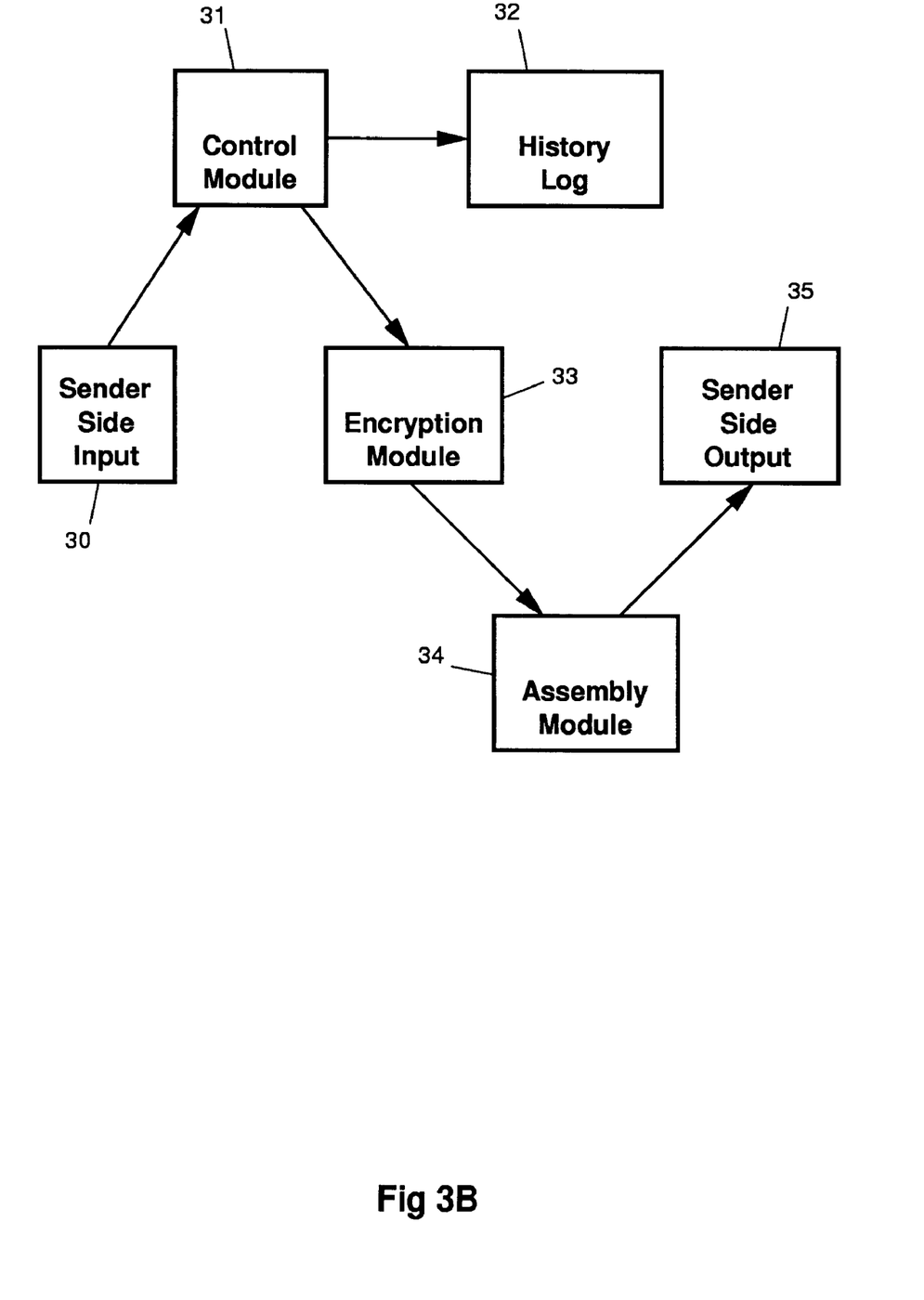
FIG. 3B is a diagram of the sender side of the apparatus in its preferred embodiment.

FIG. 3B is a diagram of the sender side of the filtering apparatus.

The sender side of the apparatus attaches the electronic stamp to a piece of electronic mail.

It comprises:

A Sender Side Input 30 connected to Mail Transport Agent 12B. Sender Side Input 30 receives electronic mail from Mail Transport Agent 12B.

A Control Module 31 connected to Sender Side Input 30. Control Module 31 creates the electronic stamp.

A History Log 32 connected to Control Module 31. History Log 32 holds previously created electronic stamps for record-keeping purposes.

An Encryption Module 33 connected to Control Module 31. Encryption Module 33 adds encryption, if necessary, to the electronic stamp. Any secure symmetric encryption algorithm may be used. Algorithms include (but are not limited to) DES, LOKI, RC2, RC4, and IDEA.

An Assembly Module 34 connected to Encryption Module 33. Assembly Module 34 attaches the electronic stamp to electronic mail.

A Sender Side Output 35 connected to Assembly Module 34. Sender Side Output 35 returns electronic mail to Mail Transport Agent 12B.

The Electronic Stamp

Figure 4:
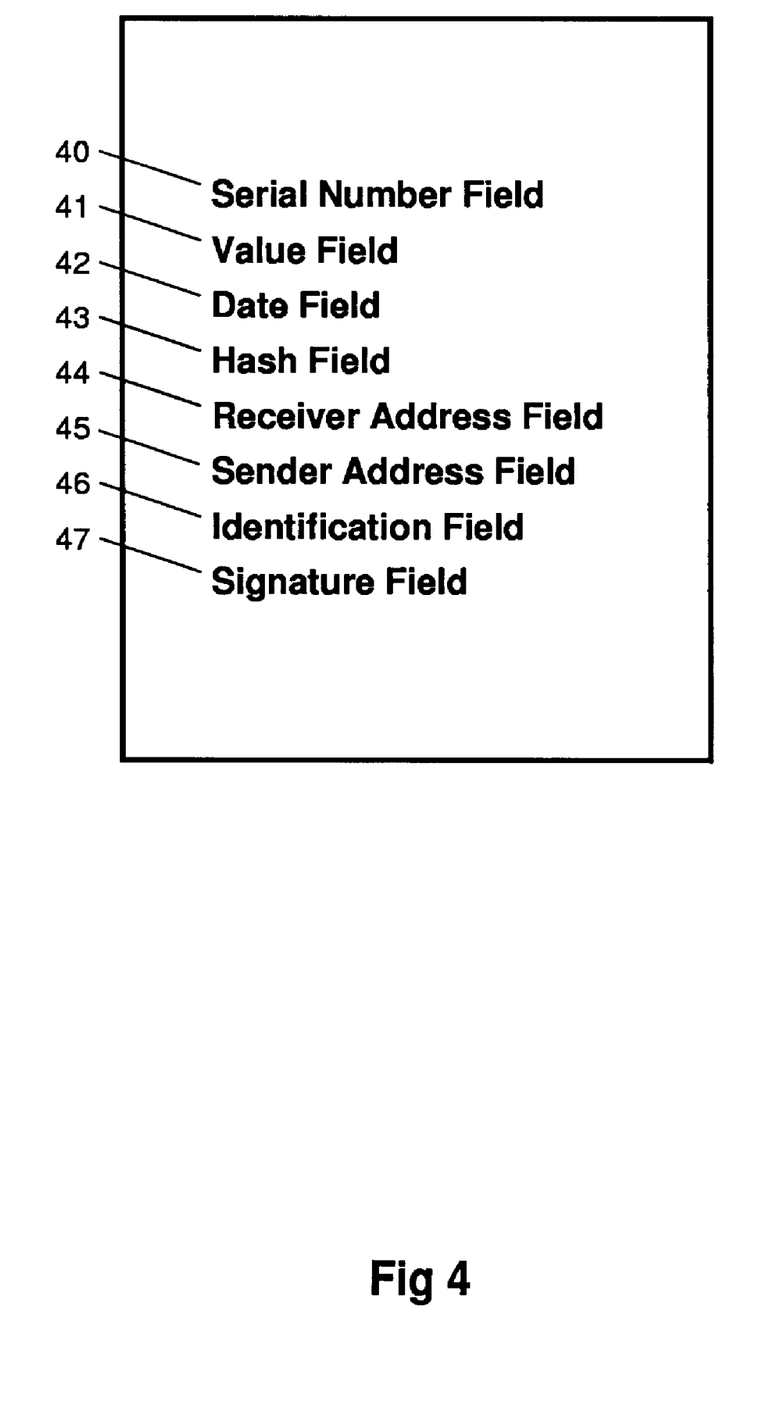
FIG. 4 is a diagram of the electronic stamp in its preferred embodiment.

FIG. 4 is a diagram of the electronic stamp.

The electronic stamp comprises the following fields:

A Serial Number Field 40. Serial Number Field 40 holds the serial number of the electronic stamp. This number is issued by the sending system. A serial number must never be reissued. The simplest serial number generator is a counter that is incremented for each electronic stamp generated.

A Value Field 41. Value Field 41 holds the amount the sender agrees to pay the receiver if the receiver accepts the electronic mail. The receiver must bill the sender for the agreed amount if he accepts the electronic mail.

A Date Field 42. Date Field 42 holds the creation date of the electronic stamp.

A Hash Field 43. Hash Field 43 holds a value computed from the contents of the body of the electronic mail. Any secure one-way hashing algorithm may be used. Algorithms include (but are not limited to) MD5, SHA, and RIPE-MD.

A Receiver Address Field 44. Receiver Address Field 44 holds the address of the receiver of the electronic mail.

A Sender Address Field 45. Sender Address Field 45 holds the address of the sender of the electronic mail.

The values in Hash Field 43, Receiver Address Field 44, and Sender Address Field 45 serve to bind the electronic stamp to a piece of electronic mail. Without this information, a malicious party could intercept the electronic mail, remove the electronic stamp, and place it on another electronic mail.

An Identification Field. Identification Field 46 holds the identification number of the sending system. Each sending system will be issued a unique identification number.

A Signature Field 47. Signature Field 47 holds the digital signature of the electronic stamp. The digital signature may be computed using any secure digital signature algorithm. Algorithms include (but are not limited to) El Gamal and DSA.

Once it assembles the values in Serial Number Field 40, Value Field 41, Date Field 42, Hash Field 43, Receiver Address Field 44, Sender Address Field 45, and Identification Field 46, the sending system generates the digital signature of the electronic stamp and signs the electronic stamp with it. Without this digital signature, a malicious party could forge an electronic stamp claiming to be from any sender in the electronic mail system.

OPERATION OF THE PREFERRED EMBODIMENT

Receiver Side Operation

The operation of the receiver side of the apparatus in its preferred embodiment comprises the following steps:

In step (a) Mail Transport Agent 12B delivers electronic mail to Receiver Side Input 20. Delivery of electronic mail awakens the receiver side apparatus and starts receiver side processing. Receiver Side Input 20 hands the electronic mail to Disassembly Module 21.

In step (b) Disassembly Module 21 removes the electronic stamp from the electronic mail. Disassembly Module 21 hands both the electronic stamp and the electronic mail to Decryption Module 22.

In step (c) Decryption Module 22 decrypts the electronic stamp. Decryption Module 22 hands both the electronic stamp and the electronic mail to Analysis Module 23.

In step (d) Analysis Module 23 reads the identity of the sending system from Identification Field 46 and the digital signature from Signature Field 47. It verifies the identity of the sending system and the integrity of the electronic stamp by testing the digital signature. If the digital signature fails the test, this is a sure indication that either the electronic stamp has been corrupted or tampered with, or someone other than the sender created the electronic stamp. In either case, the electronic stamp and the associated electronic mail should be rejected.

In step (e) Analysis Module 23 reads the hash value from Hash Field 43. It compares this value with the value it calculates from the body of the electronic mail. If the comparison fails, this is a good indication that either the electronic mail has been corrupted or the electronic stamp is no longer attached to the original piece of electronic mail. In either case, the electronic stamp and the associated electronic mail should be rejected.

In step (f) Analysis Module 23 reads the address of the receiver from Receiver Address Field 44, and the address of the sender from Sender Address Field 45. It then compares these values with the appropriate parts of the electronic mail. If the comparison fails, this is a good indication that either the electronic mail has been corrupted or the electronic stamp is no longer attached to the original piece of electronic mail. In either case, the electronic stamp and the associated electronic mail should be rejected.

In step (g) Analysis Module 23 reads the serial number from Serial Number Field 40. It then checks History Log 25 to see if this electronic stamp has been received before. If the electronic stamp is found in History Log 25, this is a good indication that the electronic mail has been delivered multiple times, either due to a fault in the electronic mail system or due to malicious intent. In either case, the electronic stamp and the associated electronic mail should be rejected.

In step (h) Analysis Module 23 reads the date from Date Field 42. If the electronic stamp is older than when History Log 25 was last truncated (truncating being of practical necessity) then the electronic stamp may have been received before—it's impossible to know. The electronic stamp and the associated electronic mail should be rejected.

In step (i) Analysis Module 23 reads the value of the electronic stamp from Value Field 41. It compares this value with the desired compensation value found in Preferences Record 24. If the value of the stamp is greater than or equal to the desired compensation value, the electronic stamp and the associated electronic mail should be accepted.

In step (j) Analysis Module 23 adds the electronic stamp to History Log 25.

In step (k) Analysis Module 23 hands the electronic mail 26.

In step (k) Receiver Side Output 26 returns the electronic mail to Mail Transport Agent 12B.

Sender Side Operation

The operation of the sender side of the apparatus in its preferred embodiment comprises the following steps:

In step (a) Mail Transport Agent 12A delivers electronic mail to Sender Side Input 30. Delivery of electronic mail awakens the sender side apparatus and starts sender side processing. Sender Side Input 30 hands the electronic mail to Control Module 31.

In step (b) Control Module 31 generates a serial number one greater than the last serial number generated. It places the serial number in Serial Number Field 40 of the electronic stamp.

In step (c) Control Module 31 places the date in Date Field 42 of the electronic stamp.

In step (d) Control Module 31 places the value of the electronic stamp in Value Field 41 of the electronic stamp. This value indicates how much the sender is willing to pay the receiver if the receiver accepts the associated electronic mail.

In step (e) Control Module 31 examines the body of the electronic mail and calculates a hash value based on the information contained therein. It writes the calculated hash value to Hash Field 43.

In step (f) Control Module 31 takes the address of the receiver of the electronic mail and writes it to Receiver Address Field 44. It takes the address of the sender of the electronic mail and writes it to Sender Address Field 45.

In step (g) Control Module 31 writes the identity of the sending system to Identification Field 46. Control Module 31 writes the digital signature of the electronic stamp to Signature Field 47. The digital signature verifies the identity of the sending system and the integrity of the values comprising the electronic stamp.

In step (h) Control Module 31 adds the new electronic stamp to History Log 32.

In step (i) Control Module 31 hands both the electronic stamp to Encryption Module 33.

In step (j) Encryption Module 33 encrypts the electronic stamp. The electronic stamp is encrypted because the networks, phone lines, and other pathways that make up Network 13 are often insecure. Encryption prevents others from tampering with the electronic stamp while the electronic mail is in transit. Encryption Module 33 hands both the electronic mail and the electronic stamp to Assembly Module 34.

In step (k) Assembly Module 34 appends the electronic stamp to the end of the body of the electronic mail. Assembly Module 34 hands the electronic mail to Sender Side Output 35.

In step (l) Sender Side Output 35 returns the electronic mail to Mail Transport Agent 12A.

AN ALTERNATIVE EMBODIMENT

The invention in its preferred embodiment places upon the receiver a significant accounting burden. The receiver must maintain records, bill each sender, and collect payments. While the system itself can assist with recordkeeping, in an electronic mail system with a multitude of senders and receivers the work can quickly become overwhelming.

In order to correct this deficiency, the following alternative embodiment is presented.

This embodiment requires the services of a third party called a bank. The bank distributes electronic tokens. Electronic tokens are digital information and can be manipulated electronically. Every electronic token is unique. The electronic tokens represent money being held in accounts with the bank. Both the sender and the receiver have accounts with the bank.

When the time comes to create an electronic stamp, the sender side apparatus withdraws an electronic token from the sender's bank account. This action decreases the sender's account balance. The sender side apparatus encodes and encrypts the electronic token and attaches it to the electronic stamp. As before, the sender side system attaches the electronic stamp to the electronic mail and sends both to the receiver.

The receiver side apparatus does exactly the reverse. It removes the electronic stamp from the electronic mail, and then decrypts and decodes the electronic token. It deposits the electronic token in the receiver's bank account. This action increases the receiver's account balance.

The bank takes care of actually transferring the money between the two accounts.

Figure 5:
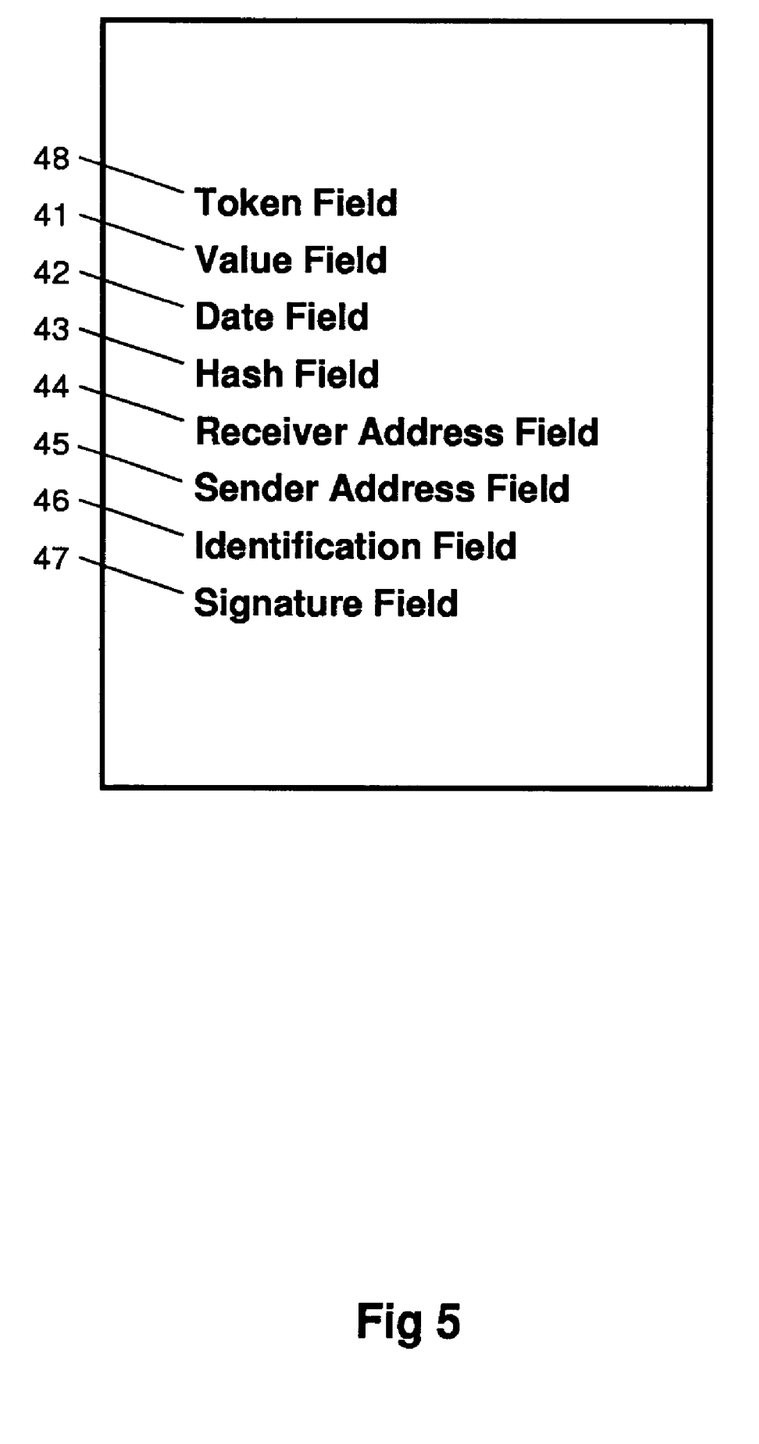
FIG. 5 is a diagram of the electronic stamp in an alternate embodiment.

FIG. 5 is a diagram of the electronic stamp.

The electronic stamp in FIG. 5 differs from the electronic stamp in FIG. 4 in only one way. Instead of Serial Number Field 40, the electronic stamp has a Token Field 48. Token Field 48 holds the electronic token from the bank.

The description and operation of the apparatus in this embodiment are identical to the description and operation of the apparatus in its preferred embodiment, except for the following differences:

In step (g) of the operation of the receiver side apparatus, Analysis Module 23 reads the electronic token from Token Field 48. It then checks History Log 25 to see if this electronic token has been received before. If the electronic token is found in History Log 25, this is a good indication that the electronic mail has been delivered multiple times, either due to a fault in the electronic mail system or due to malicious intent. In either case, the electronic stamp and the associated electronic mail should be rejected.

In step (b) of the operation of the sender side apparatus, Control Module 31 requests an electronic token from the bank. It places the electronic token in Token Field 48 of the electronic stamp.

The electronic token can be implemented with any one of the several electronic cash systems currently available. Systems include (but are not limited to) Ecash™ by DigiCash, Inc. and CyberCoin™ by CyberCash, Inc.

CONCLUSIONS, RAMIFICATIONS, AND SCOPE

The foregoing description has disclosed to those skilled in the computer and networking arts how an electronic stamp is generated and used. It has disclosed how it is attached to and sent along with a piece of electronic mail. It has disclosed how it is removed from and used to filter a piece of electronic mail.

The foregoing description has shown how the above methods are used as part of a novel electronic mail filtering apparatus for filtering junk electronic mail.

While the foregoing description included many specificities, these should not be construed as limitations on the scope of the invention, but rather as an exemplification of a preferred embodiment thereof. Many additional variations are possible, including the following:

1. The invention in its preferred embodiment uses symmetric key cryptography to protect the electronic stamp while the electronic mail is in transit. In environments where access to the network or transport medium is limited to trusted parties, this is sufficient. However, in an environment where the trustworthiness of the parties having access is unknown, public key cryptography would be a more appropriate solution.

2. If the invention is part of a system where the network or transport medium is already secure, or information sent across the medium is transparently encrypted, then the encryption steps in the invention are redundant and can be removed.

3. The invention in its preferred embodiment is designed to reduce or eliminate junk electronic mail. The invention is also suitable for use in any electronic messaging system or medium in which it is desirable to reduce or eliminate junk. Such systems include (but are not limited to) FAX, audio, video, USENET, or BBS systems.

4. The invention in its preferred embodiment simply discards rejected electronic mail. In some cases it might be better to notify the sender when this occurs, or to return the original electronic mail and attached electronic stamp.

5. The invention in its preferred embodiment passes acceptable electronic mail on to an external mail transport system for delivery and discards unacceptable electronic mail. The system could also prioritize and/or expedite acceptable electronic mail. The invention could be extended to assign a priority to a piece of electronic mail based on the value of the associated electronic stamp. User agent software could then present the electronic mail to the user sorted according to that priority or otherwise expedite the delivery of the electronic mail.

6. The invention in its preferred embodiment utilizes electronic stamps that are based on money. Electronic stamps, however, do not have to be based on money. They can be based on any limited resource with some perceived value to both the sender and the receiver. They could even be implemented as tokens given in limited quantities to each user.

7. The invention in its preferred embodiment is symmetrical—that is, users can both send stamped electronic mail and receive stamped electronic mail. It is possible, however, that a user external to the system may desire to send electronic mail to a user internal to the system. In such a case, a stamping service could be set up that would stamp electronic mail and send it for a fee.

8. The invention in its preferred embodiment appends electronic stamps to the body of the electronic mail. This was done merely as a matter of convenience. An electronic stamp may be appended, prepended, or stored in the header information of the electronic mail (in electronic mail systems that permit user defined headers), among other places.

Accordingly, the foregoing description is to be understood as being in every respect illustrative and exemplary, but not restrictive. And that the scope of the invention should be determined not by the embodiments illustrated, but by the appended claims and their legal equivalents.

I claim:

1. A method of filtering electronic mail, comprising the steps:
   a) attaching, on a sender's side, electronic stamping means having intrinsic value to a piece of outgoing electronic mail;
   b) sending both said electronic stamping means and said electronic mail to an intended receiver;
   c) comparing, on said receiver's side, the value of said electronic stamping means with said receiver's desired compensation level for receiving electronic mail; and
   d) processing, on said receiver's side, said electronic mail based on the outcome of said comparison;
   whereby, said receiver will be able to more effectively identify and process junk electronic mail.

2. The method of claim 1, further including the step:
   transferring, on said receiver's side, funds representing said value from said sender to said receiver upon acceptance of said electronic mail;
   whereby, said receiver is compensated for accepting said sender's electronic mail.

3. The method of claim 2, further including the steps:
   a) encrypting, on said sender's side, said electronic stamping means before sending it to said intended receiver; and
   b) decrypting, on said receiver's side, said electronic stamping means;
   whereby, said electronic stamping means is protected from tampering while in transit from said sender to said receiver.

4. The method of claim 1, further including the step:
   removing, on said receiver's side, the indicator of value from said electronic stamping means and transferring said indicator to a third party for recordation in receiver's account upon acceptance of said electronic mail;
   whereby, said receiver is compensated for accepting said sender's electronic mail.

5. The method of claim 4, further including the steps:
   a) encrypting, on said sender's side, said electronic stamping means before sending it to said intended receiver; and
   b) decrypting, on said receiver's side, said electronic stamping means;
   whereby, said electronic stamping means is protected from tampering while in transit from said sender to said receiver.

6. The method of claim 1, further including the steps:
   a) encrypting, on said sender's side, said electronic stamping means before sending it to said intended receiver; and
   b) decrypting, on said receiver's side, said electronic stamping means;
   whereby, said electronic stamping means is protected from tampering while in transit from said sender to said receiver.

7. An apparatus for filtering electronic mail, comprising:
   a) means for attaching an electronic stamping means to a piece of outgoing electronic mail;
   b) means for sending both said electronic stamping means and said electronic mail to an intended receiver;
   c) means for comparing the valuation of said electronic stamping means with said recipient's desired compensation level for receiving electronic mail; and
   d) means for processing said electronic mail based on the outcome of said comparison;
   whereby, said receiver will be able to more effectively identify and process junk electronic mail.

8. An attachment to an electronic mail message, comprising:
   a) an indicator of value acceptable to both a sender and a receiver of electronic mail;
   b) the electronic mail address of said sender;
   c) the electronic mail address of said receiver;
   d) a hash value computed from the contents of the electronic mail;
   such that the attachment is bound to the electronic mail message.

9. The attachment of claim 8, further comprising a serial number of the attachment.

10. The attachment of claim 8, further comprising an identification number of the sending system.

11. The attachment of claim 8, further comprising a digital signature of said attachment.

12. The attachment of claim 8, further comprising:
   a) a serial number of the attachment;
   b) an identification number of the sending system;
   c) the date of creation of said attachment;
   d) a digital signature of said attachment;
   such that the integrity of said attachment may be determined.

* * * * *